Aug. 25, 1925.

A. B. BREEZE 1,550,672

REACH ROD

Filed June 9, 1921

Inventor:
Alfred B. Breeze.

By Word·Word
Attorneys

Patented Aug. 25, 1925.

1,550,672

UNITED STATES PATENT OFFICE.

ALFRED B. BREEZE, OF CINCINNATI, OHIO, ASSIGNOR TO THE CINCINNATI BALL CRANK COMPANY, OF CINCINNATI, OHIO, A CORPORATION OF OHIO.

REACH ROD.

Application filed June 9, 1921. Serial No. 476,333.

*To all whom it may concern:*

Be it known that I, ALFRED B. BREEZE, a citizen of the United States, and residing at Cincinnati, in the county of Hamilton and State of Ohio, have invented a new and useful Improvement in Reach Rods, of which the following specification is a full disclosure.

My invention relates to connecting rods, such as steering reach rods, drag links, radius rods and the like, principally as applied to motor vehicles, wherein the rod at one or both ends is enlarged to provide a casing or socket for a ball and socket joint.

An object of the invention is to form connecting rods of a link section with a tubular casing section telescopically secured upon an end of the link section, the sections constituting an extensible unit, the tubular casing section representing a pressed steel thimble having a closed end, and threaded upon an end of the link section.

Another object of the invention is to provide a connecting rod with an enlarged socket end and an internal shoulder between the socket and link portions of the rod, formed by a plurality of different diameter tube sections nested together and upon an end of the link portion of the rod.

Other objects and advantages of the invention will be more fully set forth in the description of the accompanying drawings, forming a part of this specification, and in such drawings like characters of reference denote corresponding parts throughout the several views, of which:

Figure 1:
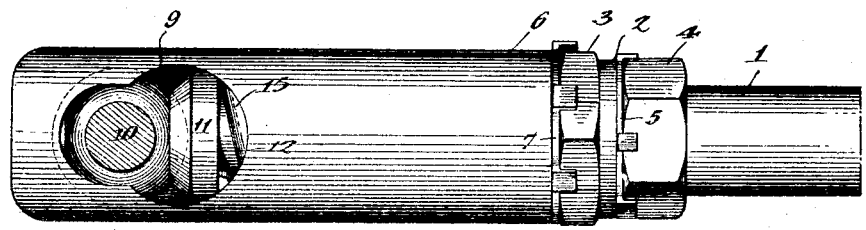
Fig. 1 is a side elevation of a hub or socket end of an adjustable tie-rod or drag link containing my improvements.
Figure 2:
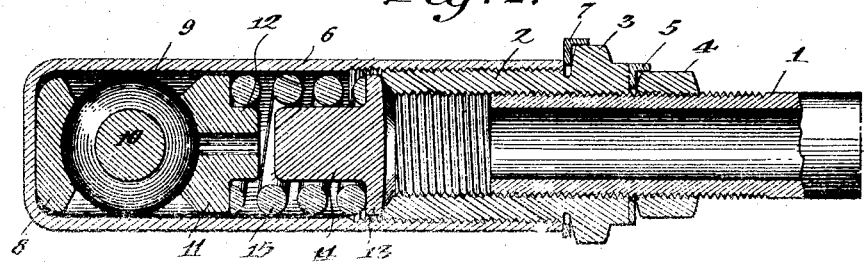
Fig. 2 is a central longitudinal section through the same.
Figure 4:
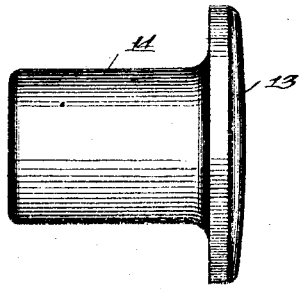
Fig. 4 is a side view of the spring seating and confining marker or member.
Figure 3:
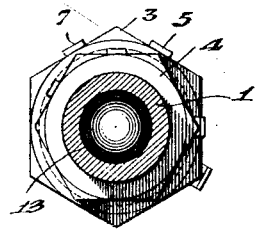
Fig. 3 is an end view of the socket from the link connecting end.

The drawings illustrate only an end portion of the link with my improved socket extensively connected thereon and a duplicate socket construction may be followed at the opposite end when the device is to be used as a reach rod for automobile steering mechanism or for such other use as the same may be adaptable, such as radius-rods, torsion-rods, tie-rods, and the like.

Referring to the drawings, 1 indicates the end portion of a connecting link length, and, as shown, comprises a piece of tubing, although it may represent a solid rod. This member 1 is threaded externally for a definite distance from the end and upon which the internally and externally threaded ferrule 2 is threaded. The ferrule 2 is provided with a hexagon headed or flanged end 3 for the reception of the wrench or turning tool. The ferrule is locked into its adjusted position upon the rod 1 by a jam nut 4 and lock washer 5. An elongated thimble or tubular socket casing 6 is threaded over the exterior of the ferrule, and the said parts are locked together by a lock washer 7 disposed between the end of the thimble and head 3 of the ferrule. The opposite end of the thimble is closed, providing a base for the socket seat disk 8, into which one side of the ball 9, at the end of the crank arm 10, seats. The opposite side of the ball 9 engages in the socket of the centrally apertured socket seat member 11, which is yieldingly sustained by a spring 15. One end of the spring 15 bears against the seat member 11 about the boss or shank 12 projecting from the seat member 11 and the opposite end of the spring bears against a washer or stop plug 13 and extends over a boss or shank extension 14 of the washer. The face of the washer is convex and marginally bears or abuts against the end of the ferrule 2. The crank arm extends through a keyhole shaped slot through the side of the thimble or casing 4. The shank extension of the stop plug 13 provides a stop or bumper for the ball and socket members, limiting the movement of said members with the thimble 2 at a point which will prevent disassembling of the parts if the springs from any cause break. The limited space between the shanks of the seat 11 and the plug 13 is sufficient to allow for the necessary spring action, but not enough for the crank arm ball to become disconnected from its sockets or released from the casing. The ball can not, under such condition, retreat sufficiently to slip through the enlarged ball entrance end of the crank arm opening through the casing. Therefore, breakage of the spring will not disrupt the use of the structure.

By adjustably mounting the casing and thimble as a unit, upon the end of the link or rod, the structure is extensible, for increasing or decreasing the reach of the rod.

To assemble the parts, the casing is unscrewed upon the ferrule sufficiently to release the rear socket seat, spring and plug, to permit the ball end of the crank arm to be inserted through the enlarged part of the key hole opening through the casing, whereupon the casing is again threaded fully upon the thimble and locked thereto, which compresses the spring to the required degree.

This construction of the socket or hub end for the link or rod, aside from its extensible features, enables the use of light weight material in the manufacture thereof over the integral enlarged swaged end rods now in general commercial use, known as one-piece rods, made under welding or successive pressing operations, or both, to provide portions of larger and smaller diameter, and a shoulder at the junction of the two different diameters. The one-piece forms require careful inspection against metal defects or weakening resulting from the swaging or welding operations. They are also required to be made to definite standard lengths, and the socket opening, in the type of rod having a hub at each end, carefully located at a definite angle, relatively adding to the cost and skill required in the manufacture thereof.

In the construction herein the link portions of the rod may represent a solid rod, or, as shown, may be made of tubing either from commercial seamless tubing or tubing formed from a sheet metal blank in which the tensile strength of the tube rod is not injured by expanding or welding processes to provide an enlarged socket end. The ferrule represents a screw machine product which can be very cheaply made in large quantities and can be made from tubing or solid stock without injuring the material by the forming process. The thimble may represent a drawn or stamped product made from sheet steel with a closed outer end and can be made of comparatively thin metal, presenting a very smooth and polished interior surface, highly desirable for the yieldingly movable parts therein. These elements nest together, making a metal thickness at their union equal to the thickness of the combined parts. The rod as a unit is of increased strength at the joint instead of being weaker as in commercial one-piece rods. The length of the rod can be varied by adjusting the ferrule upon the end of the link without affecting the tension of the spring.

The rod sections are shown as locked together by locking disks having clinching tangs, although it is obvious that any of the various commercial screw locking devices may be employed.

The ferrule 2 may represent an integral part of the link section as a headed end to provide for an enlarged diameter end to receive the thimble 6.

Having described my invention, I claim:

An extensible connecting rod, comprising a link section, a ferrule secured over an end of said link section, a tubular section secured over said ferrule, a ball end crank arm engaged through an opening in said tubular section, opposite ball seat members within said tubular section, a spring engaging one of said seat members, and an abutment member for said spring, having a convex face engaging the end of the ferrule and at an opposite side, having an elongated boss extension within the convolutions of said spring.

In witness whereof, I hereunto subscribe my name.

ALFRED B. BREEZE.